US010082581B2

(12) United States Patent
Wyler et al.

(10) Patent No.: US 10,082,581 B2
(45) Date of Patent: Sep. 25, 2018

(54) USER TERMINAL HAVING A LINEAR ARRAY ANTENNA WITH ELECTRONIC AND MECHANICAL ACTUATION SYSTEM

(71) Applicant: WorldVu Satellites Limited, St. Helier, Jersey (GB)

(72) Inventors: Gregory Thane Wyler, Sewalls Point, FL (US); Melvin S. Ni, Cupertino, CA (US)

(73) Assignee: WorldVu Satellites Limited, McLean, VA (US)

( * ) Notice: Subject to any disclaimer, the term of this patent is extended or adjusted under 35 U.S.C. 154(b) by 610 days.

(21) Appl. No.: 14/627,577

(22) Filed: Feb. 20, 2015

(65) Prior Publication Data

US 2016/0170029 A1   Jun. 16, 2016

Related U.S. Application Data

(60) Provisional application No. 62/090,091, filed on Dec. 10, 2014.

(51) Int. Cl.
| | |
|---|---|
| *G01S 19/24* | (2010.01) |
| *H01Q 3/08* | (2006.01) |
| *H01Q 3/26* | (2006.01) |
| *H01Q 3/36* | (2006.01) |

(52) U.S. Cl.
CPC ............ *G01S 19/24* (2013.01); *H01Q 3/08* (2013.01); *H01Q 3/26* (2013.01); *H01Q 3/36* (2013.01)

(58) Field of Classification Search
CPC . G01S 19/24; H01Q 3/36; H01Q 3/26; H01Q 3/08; H01Q 1/288
USPC ....... 342/354, 75, 76, 357.63, 359; 343/754, 343/757
See application file for complete search history.

(56) References Cited

U.S. PATENT DOCUMENTS 6,034,634 A * 3/2000 Karlsson .................. H01Q 3/08
342/354
6,151,496 A    11/2000 Richards et al.

FOREIGN PATENT DOCUMENTS

| EP | 0920072 A2 | 6/1999 |
| WO | 0231915 A2 | 4/2002 |
| WO | 2006057000 A1 | 6/2006 |

OTHER PUBLICATIONS

Authorized Officer: Martinez Orta, Maxima, "International Search Report and Written Opinion" issued in co-pending PCT Application No. PCT/IB2015/002455, dated Apr. 14, 2016.

* cited by examiner

Primary Examiner — Dao Linda Phan
(74) Attorney, Agent, or Firm — Kaplan Breyer Schwarz, LLP

(57) ABSTRACT

A device and method for tracking satellites and handing off from one satellite to another includes a linear phased array antenna capable of generating and receiving a radio signal beam and electronically pointing the beam, a first motor for tilting the antenna to mechanically point a radio signal beam generated with the antenna, a second motor for spinning or rotating the antenna to mechanically point the beam, and a controller for controlling the electronic and the mechanical pointing of the beam. The directions of the electronic and mechanical pointing of the beam is performed by selecting a certain angular profile for the second motor from the start point to the end point of the path and calculating a path of a satellite to be tracked from a start point to an end point.

16 Claims, 6 Drawing Sheets

USER TERMINAL HAVING A LINEAR ARRAY ANTENNA WITH ELECTRONIC AND MECHANICAL ACTUATION SYSTEM

RELATED APPLICATION

This application claims the benefit of U.S. Provisional Application No. 62/090,091, filed Dec. 10, 2014, the entire disclosure of which is incorporated herein by reference.

FIELD

The present disclosure relates to user terminals for non-geostationary satellite communications systems. More particularly, the present disclosure relates to a user terminal comprising a linear phased array antenna controlled by an electronic-mechanical actuation system.

BACKGROUND

A non-geostationary satellite system comprises a group or constellation of satellites that orbit the earth at altitudes other than geostationary orbit above the earth's surface. Unlike geosynchronous satellite systems that have satellites in geosynchronous orbits, i.e. orbital periods exactly the same as the rotation period of the earth and thus, are fixed in space in relation to the rotation of the earth, the non-geostationary satellites move at relatively higher speeds and therefore pass overhead from horizon to horizon.

The non-geostationary satellite systems have less propagation loss and less propagation delay than satellite systems with satellites orbiting a greater distances (e.g., geosynchronous satellite systems) due to the low orbit of the non-geostationary satellites. The lower propagation loss and delay improve voice, data, and other interactive communications. In addition, the cost of non-geostationary satellite systems is less than higher-orbit satellite systems because a non-geostationary satellite's receiving antenna does not have to be as large and powerful as a geostationary satellite's receiving antenna, and the satellite launch costs are relatively less expensive.

Because the non-geostationary satellites pass quickly overhead, they must be tracked and handed off from one satellite to the next, as the satellites move in and out of range of the earth-bound user terminals, to achieve continuous data communication. User terminals that use dish antennas or continuous transverse stub (CTS) panel antennas can track satellites and handoff from one satellite to the next. Dish and CTS panel antennas each require two antennas synchronously operating with one another to instantly switch between satellites and two motors for each antenna to mechanically move the antenna. Thus, dish and CTS panel antennas are relatively expensive because they require two antennas and four motors. The use of two antennas and four motors in dish and CTS panel antennas can also decrease the reliability of the user terminal.

User terminals that use planar phased array antennas can track and handoff from satellite to satellite electronically with one antenna and without the use of motors to mechanically move the antenna. Such planar phased array antennas, however, tend to be expensive.

Accordingly, an inexpensive user terminal is needed, which can track non-geostationary satellites and instantly handoff from one satellite to another as they pass overhead.

SUMMARY

Disclosed herein a device for tracking satellites and handing off from one satellite to another. In various embodiments, the device may comprise an antenna for generating and receiving a signal beam and a controller associated with the antenna for controlling electronic and mechanical pointing of the beam.

In some embodiments, the device may further comprise a satellite trajectory generator for determining directions of the electronic and mechanical pointing of the beam.

In some embodiments, the antenna may comprise a phased array antenna.

In some embodiments, the antenna may comprise a linear phased array antenna.

In some embodiments, the antenna may be capable of an electronic scanning motion that sweeps the beam in a first plane.

In some embodiments, the device may further comprise a first motor having a rotation axis that is perpendicular to the rotation axis of the electronic scanning motion and, which tilts the antenna to sweep the beam in a second plane.

In some embodiments, the device may further comprise a second motor that spins or rotates the antenna about an axis that is perpendicular to the rotation axis of the first motor.

In some embodiments the antenna may be capable of electronically pointing the beam.

In some embodiments the device may further comprise a first motor for tilting the antenna to mechanically point the beam.

In some embodiments, the device may further comprise a second motor for spinning or rotating the antenna and the first motor to mechanically point the beam.

In some embodiments, the satellite trajectory generator may determine the directions of the electronic and mechanical pointing of the beam by calculating a path of a satellite to be tracked from a start point to an end point by selecting a certain angular profile for the second motor from the start point to the end point of the path.

In some embodiments, the device may comprise a user terminal.

In some embodiments, the satellites may comprise non-geostationary satellites.

Also disclosed herein is a method for tracking satellites and handing off from one satellite to another. In various embodiments, the method may comprise generating and receiving a signal beam with an antenna and electronically and mechanically pointing the signal beam with a controller.

In some embodiments, the method may further comprising determining directions of the electronically and mechanically pointed beam with a satellite trajectory generator.

In some embodiments of the method, the antenna may comprise a phased array antenna.

In some embodiments of the method, the antenna may comprise a linear phased array antenna.

In some embodiments, the method may further comprise sweeping the beam in a first plane with an electronic scanning motion generated by the antenna.

In some embodiments, the method may further comprise tilting the antenna to sweep the beam in a second plane with a first motor having a rotation axis that is perpendicular to a rotation axis of the electronic scanning motion.

In some embodiments, the method may further comprise spinning or rotating the antenna and first motor about an axis that is perpendicular to the rotation axis of the first motor with a second motor.

In some embodiments, the method may further comprise electronically pointing the beam with the antenna.

In some embodiments, the method may further comprise tilting the antenna with a first motor to mechanically point the beam.

In some embodiments, the method may further comprise spinning or rotating the antenna with a second motor to mechanically point the beam.

In some embodiments of the method, the directions of the electronically and mechanically pointed beam are determined by selecting a certain angular profile for the second motor from the start point to the end point of the path and calculating a path of a satellite to be tracked from a start point to an end point.

In some embodiments of the method, the antenna is a component of a user terminal.

In some embodiments of the method, the satellites comprise non-geostationary satellites.

DETAILED DESCRIPTION

The user terminal of the present disclosure combines electronic and mechanical scanning to track satellites and handoff from one satellite to another. The user terminal, therefore, can be used to link to a non-geostationary satellite system of non-geostationary satellites, which in turn, may be linked to a network of computers, such as the internet. Accordingly, the user terminal of the present disclosure is capable of delivering continuous internet or other network connectivity to residences, businesses, and the like.

Figure 1:
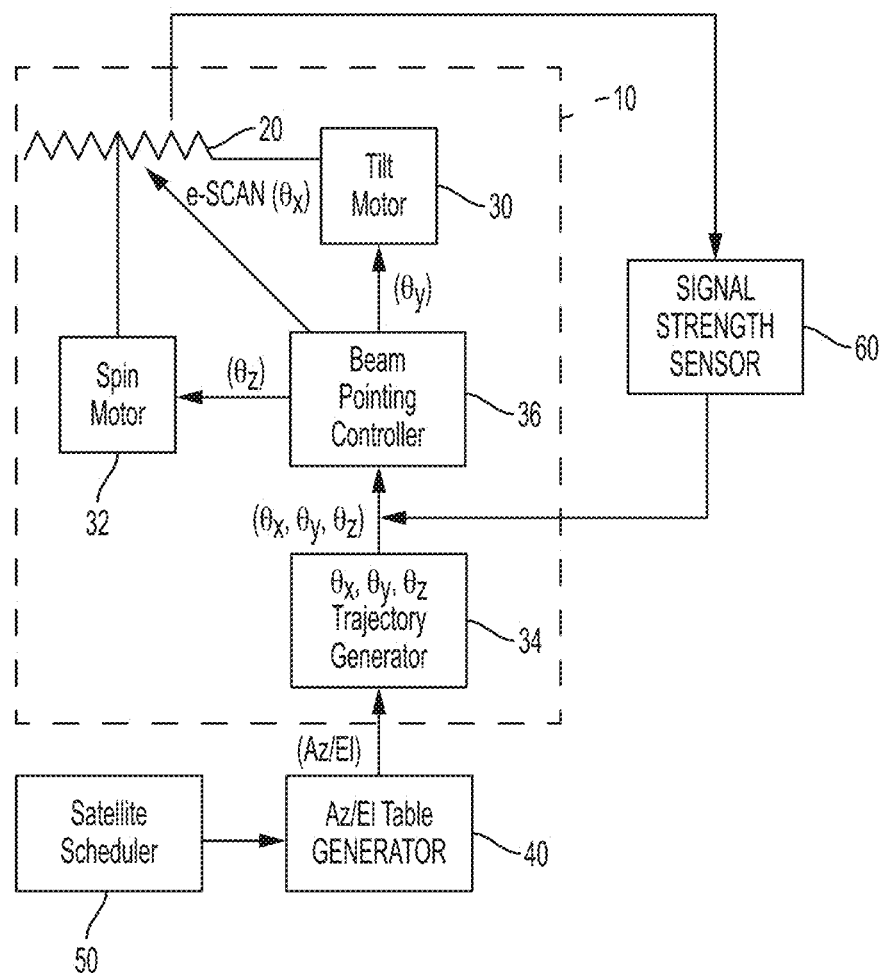
FIG. 1 is a functional block diagram of an embodiment of a user terminal of the present disclosure.

FIG. 1 is a functional block diagram of an embodiment of a user terminal 10 of the present disclosure. The user terminal 10 comprises a directive antenna 20, a first motor 30, a second motor 32, a satellite trajectory generator 34, and a beam pointing controller 36. In some embodiments, the directive antenna 20 of the user terminal 10 may be mounted on a roof of a building to provide an unobstructed field of view of the sky or a large section of sky in order to receive uninterrupted service from the non-geostationary satellites. In other embodiments, the directive antenna 20 of the user terminal 10 can be positioned on a side of the building or on the ground adjacent to the building, such that the antenna 20 has an unobstructed field of view of the sky or a large section thereof.

Figure 2:
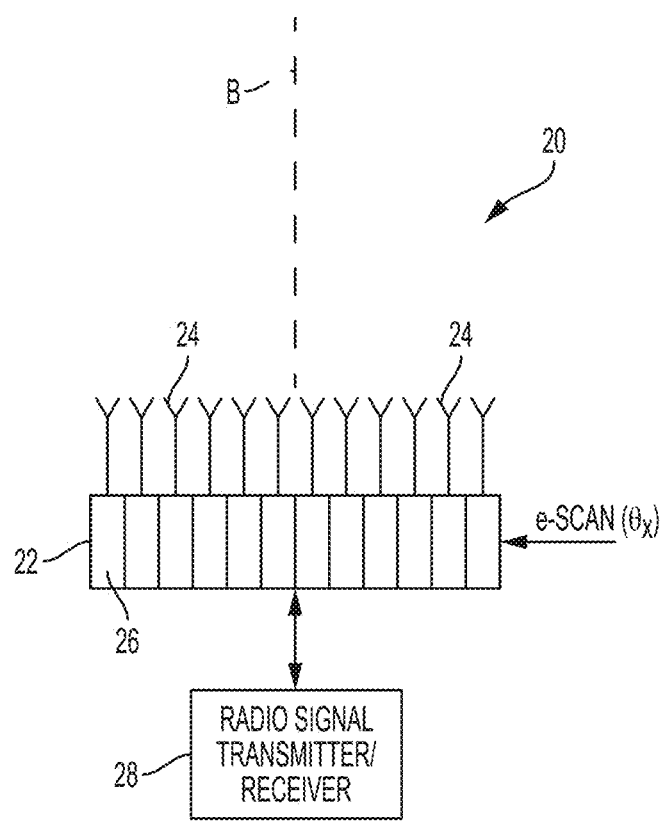
FIG. 2 is a schematic illustration of an embodiment of a linear phased array antenna that may be used in the user terminal.

In various embodiments of the user terminal 10, the directive antenna 20 may comprise a linear phased array antenna (LPAA) 22. FIG. 2 schematically illustrates an embodiment of the LPPA 22. The LPAA 22 may comprise a plurality of radiating elements 24 arranged in a straight line in one dimension, a plurality of variable phase-shifters 26 each of which may be electrically associated with one of the radiating elements 24, and a radio signal transmitter/receiver 28. The radiating elements 24 can comprise dipole antennas, waveguides, or any other type of radiating antenna elements. To transmit a radio beam B, energy from the radio signal transmitter 28 is divided up and applied to the radiating elements 24 of the array by the phase-shifters 26, which vary the phases of the radiating antenna elements 24 under the control of the beam pointing controller 36 (FIG. 1). The phase-shifters 26, therefore, can be used to electronically steer the beam B across a desired scan plane. The LPAA 22 reduces the cost of the user terminal 10, as compared to user terminals which use planar phased array antennas, because the LPAA 22 has a reduced number of phase-shifters 26.

Although the LPAA 22 can very quickly repoint its beam B via electronic scanning, it can do so only within the scan plane. Consequently, the electronic scanning capability of the LPAA 22 only provides one degree of (scanning) freedom. Two degrees of freedom, however, are required to track a satellite and three degrees of freedom are required for satellite-to-satellite handoff, i.e., to look for the next satellite and make contact with it so that the moment contact with one satellite ends, contact with another satellite commences. The first motor of the user terminal 10 of the present disclosure (FIG. 1) is operatively configured to rock or tilt the LPAA 22 in a direction orthogonal to the scan direction to provide another degree of scanning freedom. The second motor of the user terminal 10 of the present disclosure is operatively configured to rotate the LPAA 22 about a vertical axis to provide another degree of freedom. Hence, the LPAA 22 of the user terminal of the present disclosure has three degrees of freedom, which allows the beam B of the LPAA 22 to be steered across a scan plane that covers the current satellite and the next satellite simultaneously during handoff.

Figure 3:
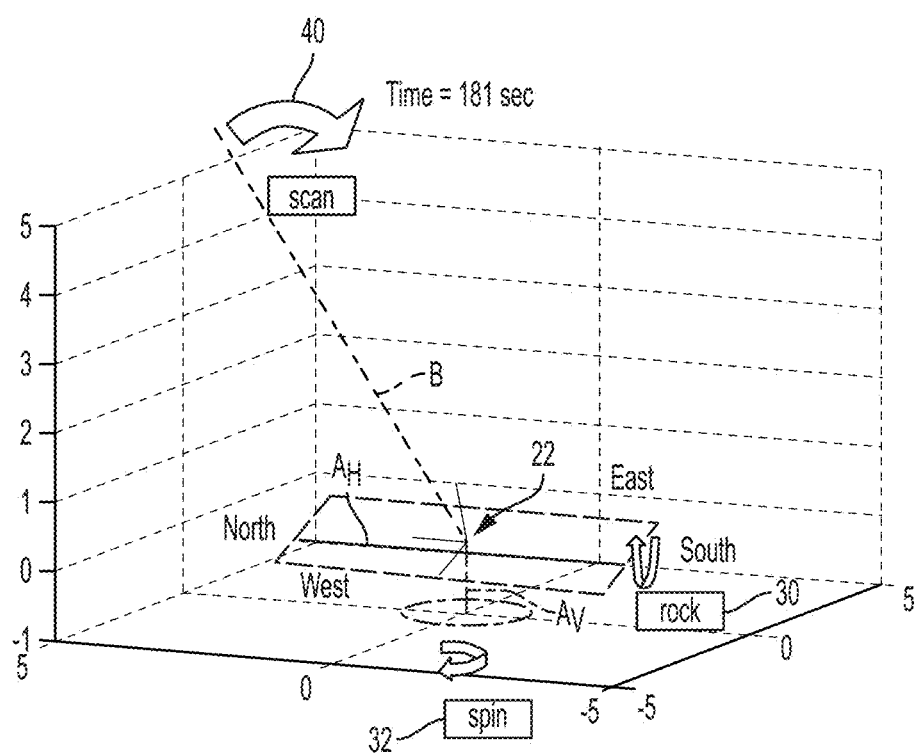
FIG. 3 is a schematic illustration of an embodiment of a scan plane and motor rotation geometry of the linear phased array antenna.

FIG. 3 illustrates an embodiment of the scan plane geometry that the LPAA 22 of the user terminal 10 of the present disclosure is capable of scanning. The LPAA 22 generates a radio scan beam B with an electronic scan (e-scan) motion 40 that can sweep or angle the beam B in a North-South plane. The first motor 30 is operatively configured to provide a rotation axis $A_H$ that is horizontal and perpendicular to the axis of the e-scan motion 40, which rocks or tilts the LPAA 22, and therefore, sweeps the beam B in an East-West plane. The second motor 32 is operatively configured to spin or rotate the LPAA 22 and the first motor 30 and the first motor's rotation axis $A_H$ about a vertical axis Av. In some embodiments, the first motor 30 and second motor 32 may each be stepper motors which are capable of having their rotation divided into a number of steps so that the motor's angular position (scanning angle) can be controlled in steps.

E-scan angles and motor scanning angles for satellite tracking and handoff are determined by the satellite trajectory generator 34 (FIG. 1). The satellite trajectory generator 34 can include a processor and a memory for storing instructions for a beam pointing algorithm. The processor executes the beam pointing algorithm instructions to compute e-scan angles and motor scanning angles for tracking the non-geostationary satellites and handing off from one satellite to another. The e-scan and motor scanning angles computed by the satellite trajectory generator 34 are transmitted to the beam pointing controller 36 (FIG. 1). The beam pointing controller 36 adjusts the phases of the radiating antenna elements 24 according to the e-scan angles and the motor position of the motors 30, 32 according to the motor angles, to steer or sweep the beam B generated by the LPAA 22 across the desired scan plane that covers the current satellite and the next satellite simultaneously during satellite handoff.

Figure 4:
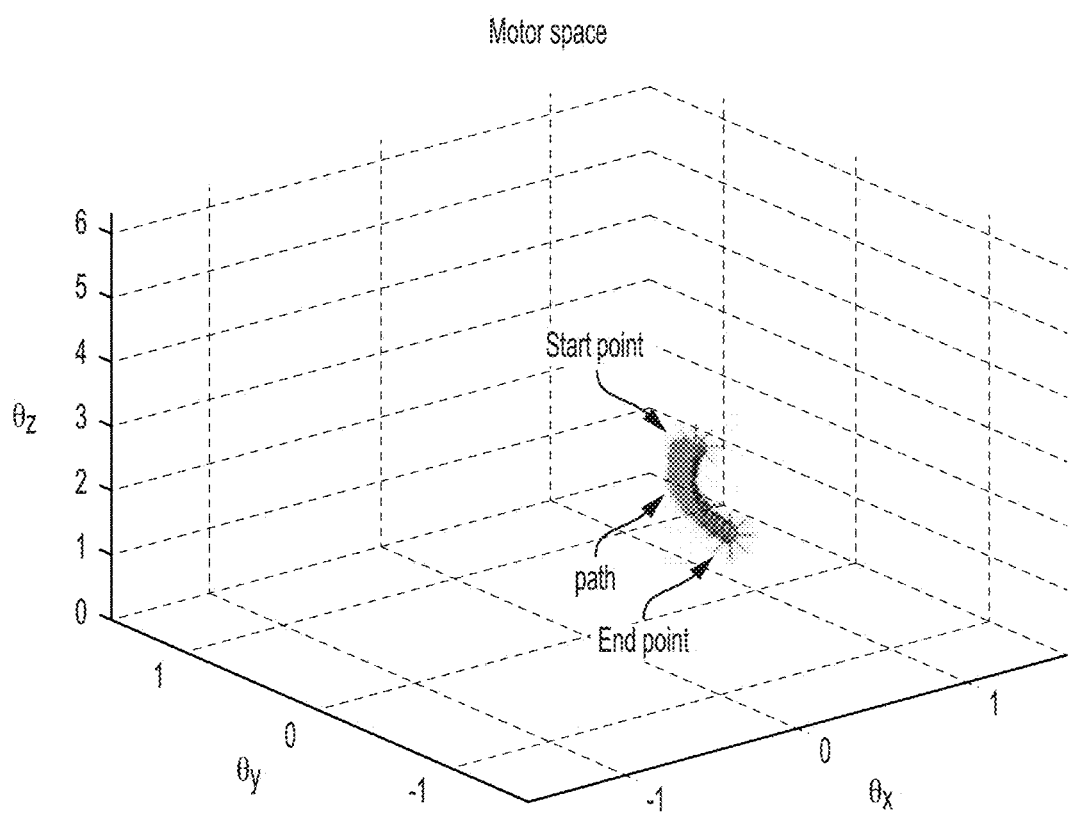
FIG. 4 is a schematic illustration depicting how each satellite pass is a path through three-dimensional scan-motor angle space.

FIG. 4 illustrates how each satellite pass is a path through three-dimensional motor space, which comprises e-scan angle θx (LPAA 22 radio beam), rocking angle θY (first motor 30), and spin angle θz (second motor 32). The start point and the end point of the satellite's path have exact solutions, but the points of the path between the start and end points are under-constrained, having an infinite number of mathematically valid solutions. The beam pointing algorithm, in various embodiments, computes a path from the start point to the end point by selecting a certain angular profile for the second motor 32 from the start point to the end point of the path. For example, in some embodiments, the beam pointing algorithm computes the path from the start point to the end point by constraining the spin velocity of the second motor 32 to a constant angular velocity from the start point to the end point of the path. This constraint allows for rapid computation, which results in a smooth path that minimizes motor wear. In other embodiments, the beam pointing algorithm can include one or more additional constraints for computing a path from the start point to the end point. In still other embodiments, the beam pointing algorithm can include one or more constraints other than the spin velocity constraint described above. Such additional or other constraints may include without limitation minimizing the motor speed of the first and second motors.

Figure 5:
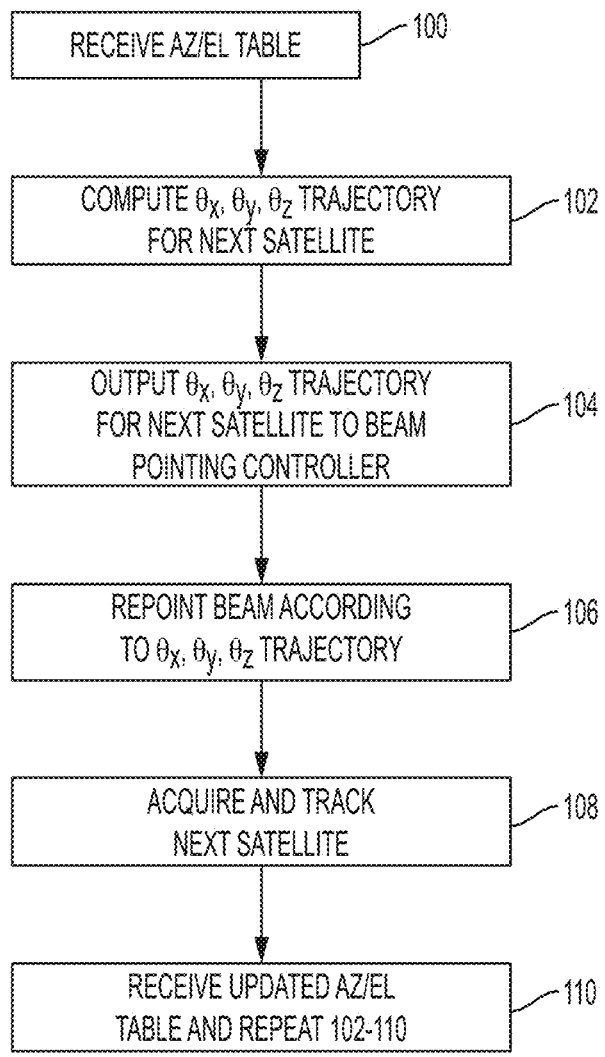
FIG. 5 is a flowchart illustrating an embodiment of a method for tracking a non-geostationary satellite and handing off from that satellite to another non-geostationary satellite, with the user terminal.

FIG. 5 is a flowchart illustrating an embodiment of a method for tracking a non-geostationary satellite and handing off from that satellite to another non-geostationary satellite, with the user terminal. Prior to each satellite pass, the beam pointing algorithm executed by the processor of the satellite trajectory generator 34 requires as inputs, the ground-to-satellite azimuth (direction in the horizontal north-south-east-west plane) and elevation (angle above the horizontal plane) time history (or equivalent), as well as a single azimuth and elevation point of the next satellite at the moment of handoff. Therefore, in box 100, the θx, θy, θz satellite trajectory generator 34 receives a table of time-tagged azimuth and elevation angles of the current satellite being tracked, and the next satellite to be tracked. This information may be generated at an operations center by an azimuth/elevation table generator 40, which receives satellite trajectory information about the non-geostationary satellites from a satellite scheduler 50. The azimuth/elevation table generator 40 transmits the table of time-tagged azimuth and elevation angles of, the current satellite being tracked, and the next satellite to be tracked, to the satellite trajectory generator of the user terminal. In box 102, the processor of the satellite trajectory generator 34 (FIG. 1) executes the beam pointing algorithm to compute the θx, θy, θz trajectory for the next satellite, using the information in the table of time-tagged azimuth and elevation angles. In box 104, satellite trajectory generator 34 outputs the θx, θy, θz trajectory for the next satellite to the beam pointing controller 36 (FIG. 1). At this time, the LPAA is pointing the radio beam at the current satellite at the end of the current satellite's path or track. In box 106, the beam pointing controller 36 causes the LPAA 22 to repoint the radio beam away from the current satellite and at the next satellite in accordance with the θx, θy, θz trajectory for the next satellite received from the satellite trajectory generator 34. Although the next satellite should be in center of the beam, it typically is not. Therefore, the beam pointing controller dithers the beam around the computed θx, θy, θz trajectory for the next satellite and makes minor pointing corrections based on a return signal generated by a signal strength sensor 60 (FIG. 1). Because the next satellite is in the plane of all possible electronic scan angles, in box 108, the LPAA of the user terminal acquires the next satellite and tracks it as the current satellite. In box 110, the satellite trajectory generator 34 receives an updated table of time-tagged azimuth and elevation angles with, the current satellite being tracked, and the next satellite to be tracked and the processes in boxes 102-110 are repeated.

Figure 6:
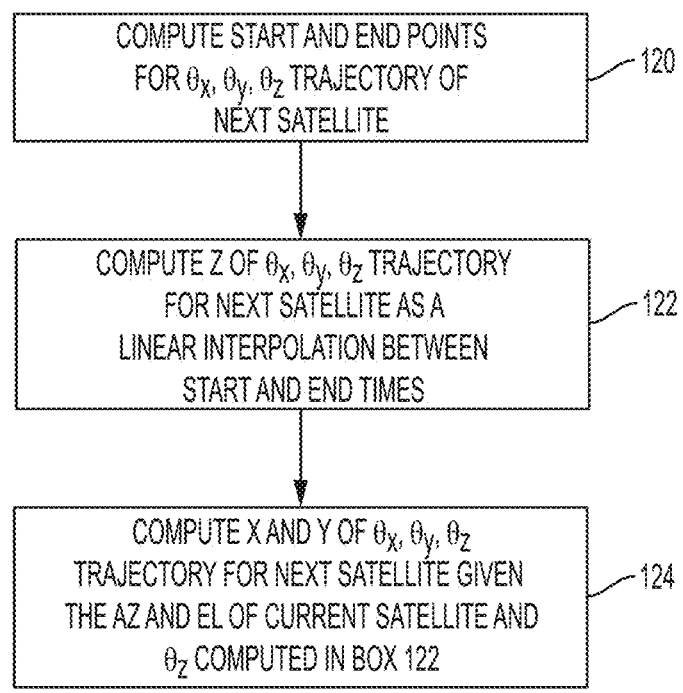
FIG. 6 is a flowchart illustrating an embodiment of a beam pointing algorithm executed by a satellite trajectory generator to compute the trajectory for the next satellite.

FIG. 6 is a flowchart illustrating an embodiment of the beam pointing algorithm executed by the satellite trajectory generator to compute θx, θy, θz trajectory for the next satellite, given the table of time-tagged azimuth and elevation angles of the current satellite being tracked and the next satellite to be tracked. In box 120, the satellite trajectory generator 34 (FIG. 1) computes the start and end points of the θx, θy, θz trajectory for the next satellite using the following equations:

azimuth=arctan($Ux/Uy$), where $Ux$=−cos(θz)sin(θy)+sin(θz)sin(θx)cos(θy)

$Uy$=sin(θz)sin(θy)+cos(θz)sin(θx)cos(θy)

elevation=arcsin($Uz$), where $Uz$=cos(θx)cos(θy); and plane of $e$-scan=plane defined by lines of sights to the current satellite and next satellite, or:

sin(phi)= . . .

sin(θz)cos(θx)($Uy1Uz2$−$Uz1Uy2$)+ . . .

cos(θz)cos(θx)($Uz1Ux2$−$Ux1Uz2$)− . . .

sin(θx)($Ux1Uy2$−$Uy1Ux2$), where

Ux1 is the eastward component of the line-of-sight unit vector to satellite 1;
Uy1 is the northward component of the line-of-sight unit vector to satellite 1;
Uz1 is the upward component of the line-of-sight unit vector to satellite 1;
Ux2 is the eastward component of the line-of-sight unit vector to satellite 2;
Uy2 is the northward component of the line-of-sight unit vector to satellite 2;
Uz2 is the upward component of the line-of-sight unit vector to satellite 2;
phi is the angle between the lines of sight vectors to satellites 1 and 2;

where the start point of the next satellite equals the end point of the current satellite, and where if two unique solutions exist for the end point of the next satellite, discard the solution where θz is greater than 180 degrees.

In box 122, the satellite trajectory generator 34 computes θz of the next satellite's θx, θy, θz trajectory for all times between the start and end points. The satellite trajectory generator 34 computes θz as a linear interpolation between start and end times using the equation:

θz($t$)=θz(start time)+(total change in θz)*(time since start)/total time duration of the current satellite.

In other embodiments, above equation can be replaced with a spline equation for θz or an optimization equation for minimizing the speed of the first and second motors, or some other measure of motor action.

Spline equation for θz:

θz(t)=f(t), where f is any function subject to constraints which may include θz at start and end times, velocity of θz at start and end times, and acceleration of θz at start and end times.

Optimization equation:

θz(t)=g(t), where g is any function subject to constraints which may include θz at start and end times, and integrated square of θy velocity over time and integrated square of θz velocity over time.

In box 124, the satellite trajectory generator 34 computes θx and θy of the next satellite's θx, θy, θz trajectory for all times between the start and end points using the equations below, given the azimuth and the elevation of the current satellite and given Δz computed in box 122:

azimuth=function 1(θx,θy,θz); and azimuth=arctan($U_x/U_y$), where $U_x$=−cos(θz)sin(θy)+sin(θz)sin(θx)cos(θy)

$U_y$=sin(θz)sin(θy)+cos(θz)sin(θx)cos(θy)

elevation=function 2(θx,θy).

elevation=arcsin($U_z$), where $U_z$=cos(θx)cos(θy)

Although the user terminal and method for satellite tracking and handoff have been described in terms of illustrative embodiments, they are not limited thereto. Rather, the appended claims should be construed broadly to include other variants and embodiments of same, which may be made by those skilled in the art without departing from the scope and range of equivalents of the terminal and method.

What is claimed is:

1. A device for tracking satellites and handing off from one satellite to another, the device comprising:
   an antenna for generating a signal beam;
   a first motor for tilting the antenna;
   a second motor for rotating the antenna;
   a satellite trajectory generator for determining directions for electronically and mechanically pointing the beam by calculating a path of a satellite to be tracked from a start point to an end point, the calculation including selecting a certain angular profile for the second motor from the start point to the end point of the path; and
   a controller for adjusting an electronic scan angle of the antenna according to the directions determined with the satellite trajectory generator to electronically point the beam, and for adjusting positions of the first and second motors according to the directions determined by the satellite trajectory generator to mechanically point the beam.

2. The device of claim 1, wherein the antenna comprises a phased array antenna.

3. The device of claim 1, wherein the antenna comprises a linear phased array antenna.

4. The device of claim 1, wherein the electronic pointing of the beam comprises an electronic scanning motion that sweeps the beam in a first plane.

5. The device of claim 4, wherein the first motor having a rotation axis that is perpendicular to a rotation axis of the electronic scanning motion and, which tilts the antenna to sweep the beam in a second plane.

6. The device of claim 5, wherein the second motor rotates the antenna about an axis that is perpendicular to the rotation axis of the first motor.

7. The device of claim 1, wherein the device comprises a user terminal.

8. The device of claim 1, wherein the satellites comprise non-geostationary satellites.

9. A method for tracking satellites and handing off from one satellite to another, the method comprising:
   providing an antenna for generating a signal beam;
   providing a first motor for tilting the antenna;
   providing a second motor for rotating the antenna;
   determining, with a satellite trajectory generator, directions for electronically and mechanically pointing the beam by calculating a path of a satellite to be tracked from a start point to an end point, the calculation including selecting a certain angular profile for the second motor from the start point to the end point of the path; and
   adjusting an electronic scan angle of the antenna with a controller according to the directions determined with the satellite trajectory generator to electronically point the beam; and
   adjusting positions of the first and second motors with the controller according to the directions determined with the satellite trajectory generator to tilt and rotate the antenna to mechanically point the beam.

10. The method of claim 9, wherein the antenna comprises a phased array antenna.

11. The method of claim 9, wherein the antenna comprises a linear phased array antenna.

12. The method of claim 9, wherein the electronic pointing of the beam comprises sweeping the beam in a first plane with an electronic scanning motion generated by the antenna.

13. The method of claim 12, wherein the tilting of the antenna comprises sweeping the beam in a second plane with the first motor, the first motor having a rotation axis that is perpendicular to a rotation axis of the electronic scanning motion.

14. The method of claim 13, wherein the rotating of the antenna is about an axis that is perpendicular to the rotation axis of the first motor.

15. The method of claim 9, wherein the antenna is a component of a user terminal.

16. The method of claim 9, wherein the satellites comprise non-geostationary satellites.

* * * * *